United States Patent Office 3,843,526
Patented Oct. 22, 1974

3,843,526
NOVEL INTUMESCENT COMPOSITION CONTAINING AN AROMATIC AMINE SULFATE
Shirley H. Roth, Highland Park, and Joseph Green, East Brunswick, N.J., assignors to Cities Service Company, New York, N.Y.
No Drawing. Continuation-in-part of abandoned application Ser. No. 99,642, Dec. 18, 1970. This application Apr. 28, 1972, Ser. No. 248,704
Int. Cl. B27k 3/00
U.S. Cl. 252—8.1                           6 Claims

ABSTRACT OF THE DISCLOSURE

Boric acid, an organoboric acid, an organoborate, or an organoboroxine is used to improve the char structure of an intumescent aromatic amine sulfate, such as p-nitroaniline bisulfate, o-nitroaniline bisulfate, etc.

CROSS-REFERENCE TO RELATED APPLICATION

This application is a continuation-in-part of copending application S.N. 99,642, filed Dec. 18, 1970, now abandoned.

BACKGROUND OF THE INVENTION

Field of the Invention

This invention relates to intumescent compositions and more particularly relates to such compositions comprising an aromatic amine sulfate as the intumescent agent.

Description of the Prior Art

As taught in U.S. Pat. 3,535,130, certain aromatic amine sulfates are capable of intumescing to form a large volume of carbonaceous char when heated. Unfortunately, the char thus formed is undesirably soft and fluffy and frequently incapable of adhering to a substrate or supporting its own weight. When a char does not adhere to a substrate, it cannot protect it. Thus, these intumescent agents frequently give surprisingly poor flame spread ratings when used.

SUMMARY OF THE INVENTION

An object of this invention is to provide a novel intumescent composition.
Another object is to improve the char structure of a foam obtained by the intumescence of an aromatic amine sulfate.
These and other objects are attained by using as an intumescent agent an aromatic amine sulfate in conjunction with a boron compound of the group consisting of boric acid, an organoboric acid, an organoborate, and an organoboroxine.

DESCRIPTION OF THE PREFERRED EMBODIMENTS

The aromatic amine sulfate used in the practice of the invention is a sulfate, preferably a bisulfate, of p-nitroaniline, o-nitroaniline, m-nitroaniline, 3-amino-1-nitronaphthalene, 4 - amino-4'-nitrobiphenyl, 1,5-diamino-4,8-dinitronaphthalene, 2 - amino-7-nitrofluorene, 4-amino-2-nitrofuran, 5-nitroisatoic anhydride, or 4-nitroacetanilide. The preferred aromatic amine sulfates are p-nitroaniline bisulfate and o-nitroaniline bisulfate.

The boron compound is preferably boric acid, but, as indicated above, it may also be an organoboric acid, an organoborate, or an organoboroxine. When it is an organoboron compound, it preferably contains 1–6 carbon atoms/organic radical. Exemplary of suitable organoboron compounds are p-bromophenylboric acid, m-aminophenylboric acid hemisulfate, trimethyl borate, triethyl borate, triethanolamine borate, trimethoxyboroxine, triisopropylboroxine, etc. The boron compound is used in an amount of about 1–5, preferably about 1–3, mols per mol of the aromatic amine sulfate.

For use in protecting a substrate from heat and fire, the intumescent agents of the invention may be applied in any suitable manner, e.g., electrodepositoin, spraying of powdered intumescent agent onto an adhesive substrate, etc. However, it is usually preferred to compound the intumescent agent with a nitrocellulose binder and optionally also with one or more of the other ingredients conventionally used in intumescent compositions, e.g., stabilizers, dispersing agents, pigments, driers, biocides, anti-foamers, thickeners, protective colloids, fillers, blowing agents, etc.; disperse the composition in a suitable liquid medium, e.g., water or a solvent or solvent mixture; and apply the coating composition thus formed to the substrate to be protected, e.g., a wood, paper, metal, or plastics substrate. As is the case with conventional intumescent coating compositions, it is frequently convenient to apply these coating compositions in the form of a paint having a solids content of about 10–70% by weight and an intumescent agent/binder weight ratio of about 0.075–14/1 to deposit a coating having a dry thickness of about 0.001–0.75 inch. Paints wherein the weight of intumescent agent constitutes about 7–70% of the combined weights of intumescent agent and binder are particularly desirable.

The intumescent agents of the invention intumesce to form an excellent volume of foam having a good, closed-cell structure and a density of about 1.5–10 grams per cubic centimeter. The char has greater rigidity and adherence to substrates than the char formed without the use of a boron compound, and the insulated substrates of the invention have lower heat conductivity.

The following examples are given to illustrate the invention and are not intended as a limitation thereof. Unless otherwise specified, quantitites mentioned are quantities by weight.

EXAMPLE I

Part A—Control

Place one gram of p-nitroaniline bisulfate in an aluminum pan and flame it wth a propane torch. The compound intumesces to form an excellent volume of fluffy foam.

Part B—Control

Place one gram of boric acid in an aluminum pan and flame it with a propane torch. The compound melts, loses weight, and forms a clear, colorless glass having a lesser volume than the starting material. There is no intumescence.

Part C

Place a mixture of one gram of p-nitroaniline bisulfate and one gram of boric acid in an aluminum pan and flame it with a propane torch. The mixture intumesces to form a foam having greater rigidity and about ⅔ to ¾ the volume of the foam of Part A.

Part D

Perform three experiments by repeating Part C except for employing p-nitroaniline bisulfate/boric acid mol ratios of 1:1, 1:2, and 1:3, respectively. The experiments result in the formation of an enormous volume of fluffy foam, an equally large volume of more rigid foam, and a lesser volume of far more rigid foam, respectively.

EXAMPLE II

Part A—Control

Place one gram of o-nitroaniline bisulfate in an aluminum pan and flame it with a propane torch. The compound intumesces to form an excellent volume of very fluffy char.

Part B—Control

Place one gram of trimethoxyboroxine in an aluminum pan and flame it with a propane torch. The compound burns with a green flame and forms a white foam which turns black and collapses.

Part C

Place a mixture of one gram of o-nitroaniline bisulfate and one gram of trimethoxyboroxine in an aluminum pan and flame it with a propane torch. The mixture intumesces to form a char having greater rigidity and a somewhat smaller volume than the char of Part A.

EXAMPLE III—CONTROL

Dissolve 98.6 parts of a commercial nitrocellulose (69 parts of dry nitrocellulose and 29.6 parts of ethanol) in methyl ethyl ketone. Add (1) additional methyl ethyl ketone to a total of 328 parts, (2) 101.4 parts of ethanol, and (3) 468 parts of p-nitroaniline bisulfate with stirring, and then incrementally add another 105 parts of methyl ethyl ketone with stirring. Ball mill the mixture for 20 hours to form a coating composition.

Apply two coats of the composition to each of eight preconditioned, primed poplar panels to form films having a dry thickness of about 0.018–0.022 inch, and overcoat four of these coated panels with a nitro-cellulose lacquer. Test the panels in accordance with the two-foot tunnel test described in H. L. Vandersall, "The Use of a Small Flame Tunnel for Evaluating Fire Hazard," Journal of Paint Technology, Vol. 39, No. 511, pp. 494–500 (1967).

In each case, the coating intumesces to form a very fluffy foam which separates from the panel and, therefore, does not protect it. The overcoated panels have an average flame spread rating of 111 and an insulative value greater than 175° C. (the highest temperature on the scale of the recorder); the other panels have an average flame spread rating of 110.

EXAMPLE IV

Dissolve 98.6 parts of the commercial nitro-cellulose of Example III in 432 parts of methyl ethyl ketone. Add 101.4 parts of ethanol, 468 parts of p-nitroaniline bisulfate, and 244.8 parts of boric acid, and continue stirring for an additional 15 minutes. Ball mill the mixture for 20 hours while venting occasionally and incrementally adding a mixture of 45.2 parts of methyl ethyl ketone and 11 parts of ethanol. Then add a mixture of 48.5 parts of methyl ethyl ketone and 11.8 parts of ethanol, and mill for an additional 20 hours.

Prepare and test eight test panels as in Example III. The overcoated panels have an average flame spread rating of −6, an average insulative value of 106° C., and an average degree of intumescence of 41 mm.; the other panels have an average flame spread rating of −9, an average insulative value of 121° C., and an average degree of intumescence of 34 mm.

EXAMPLE V

Dissolve 98.6 parts of the commercial nitrocellulose of Example III in 432 parts of methyl ethyl ketone. Add 101.4 parts of ethanol, 468 parts of p-nitroaniline bisulfate, and 366.9 parts of boric acid, and continue stirring for an additional 15 minutes. Ball mill the mixture for 20 hours while venting occasionally and incrementally adding a mixture of 58 parts of methyl ethyl ketone and 15 parts of ethanol. Then add a mixture of 64.6 parts of methyl ethyl ketone and 15.7 parts of ethanol, mill for an additional 20 hours, add a mixture of 45.2 parts of methyl ethyl ketone and 11 parts of ethanol, and mill for a final 20 hours.

Prepare and test eight panels as in Example III. The overcoated panels have an average flame spread rating of −0.5, an average insulative value of 122° C., and an average degree of intumescence of 34 mm.; the other panels have an average flame spread rating of −2, an average insulative value of 143° C., and an average degree of intumescence of 32 mm.

It is obvious that many variations may be made in the products and processes set forth above without departing from the spirit and scope of this invention.

What is claimed is:

1. An intumescent composition comprising as the intumescent agent a mixture of (A) one molar proportion of a sulfate of an aromatic amine of the group consisting of p-nitroaniline, o-nitroaniline, m-nitroaniline, 3-amino-1-nitronaphthalene, 4-amino-4'-nitro-bphenyl, 1,5-diamino 4,8-dinitronaphthalene, 2-amino-7-nitrofluorene, 4-amino-2-nitrofuran, 5-nitroisatoic anhydride, and 4-nitroacetanilide and (B) about 1–5 molar proportions of a boron compound of the group consisting of boric acid, an organoboric acid, an organoborate, and an organoboroxine.

2. The composition of claim 1 wherein the aromatic amine is p-nitroaniline.

3. The composition of claim 1 wherein the aromatic amine is o-nitroaniline.

4. The composition of claim 1 wherein the boron compound is boric acid.

5. The composition of claim 1 comprising the intumescent agent and a nitrocellulose binder.

6. The composition of claim 5 consisting essentially of about 0.075–14 parts by weight of the intumescent agent per part by weight of the binder.

References Cited

UNITED STATES PATENTS

| | | | |
|---|---|---|---|
| 3,535,130 | 10/1970 | Webb | 106—15 FP |
| 2,594,937 | 4/1952 | Lauring | 106—15 FP X |
| 3,131,071 | 4/1964 | Hunter | 106—15 FP |
| 3,371,058 | 2/1968 | Perizzolo | 106—15 FP X |
| 2,723,212 | 11/1955 | Aarons et al. | 106—15 FP X |
| 2,948,641 | 8/1960 | McCluer | 106—15 FP X |

STEPHEN J. LECHERT, Jr. Primary Examiner

U.S. Cl. X.R.

252—378 R, 558; 106—15 FP; 117—136, 137